(12) United States Patent
Ben-Yaacov

(10) Patent No.: US 8,815,098 B2
(45) Date of Patent: Aug. 26, 2014

(54) METHOD OF TREATING RAW SEWAGE SLURRY

(75) Inventor: Ahiam Ben-Yaacov, Kiryat Malachi (IL)

(73) Assignee: Bar-Edan Manufacturing and Development Ltd., Kiryat Malachi (IL)

(*) Notice: Subject to any disclaimer, the term of this patent is extended or adjusted under 35 U.S.C. 154(b) by 1414 days.

(21) Appl. No.: 11/911,082

(22) PCT Filed: Apr. 4, 2006

(86) PCT No.: PCT/IL2006/000427
§ 371 (c)(1),
(2), (4) Date: May 28, 2008

(87) PCT Pub. No.: WO2006/109293
PCT Pub. Date: Oct. 19, 2006

(65) Prior Publication Data
US 2008/0314842 A1    Dec. 25, 2008

(30) Foreign Application Priority Data
Apr. 14, 2005  (IL) .......................... 168041

(51) Int. Cl.
*C02F 1/30* (2006.01)
*C02F 11/14* (2006.01)

(52) U.S. Cl.
USPC .............. 210/748.1; 210/748.16; 210/764

(58) Field of Classification Search
USPC ............ 210/609, 613, 748.01, 748.06, 748.1
See application file for complete search history.

(56) References Cited

U.S. PATENT DOCUMENTS

| 4,038,028 A * | 7/1977 | La Roche ................ 422/186 |
| 4,187,176 A | 2/1980 | Levaillant |
| 4,201,918 A | 5/1980 | Latzer |
| 4,306,978 A * | 12/1981 | Wurtz ................ 210/750 |
| 5,385,673 A * | 1/1995 | Fergen ................ 210/710 |
| 5,417,861 A * | 5/1995 | Burnham ................ 210/609 |
| 2004/0154988 A1* | 8/2004 | Sheets, Sr. ................ 210/718 |

FOREIGN PATENT DOCUMENTS

| JP | 54109244 | 8/1979 |
| JP | 11319793 | 11/1999 |
| KR | 10-208956 | 4/1999 |

OTHER PUBLICATIONS

40 CFR 257, Jul. 1, 1996.*
International Search Report issued in corresponding International Application No. PCT/IL2006/00427, filed Apr. 4, 2006.
McKeown, J. 1996 "Electron sterilization of sewage sludge: A real case comparison with other processes" *Radiation Physics and Chemistry* 47:469-473.

* cited by examiner

*Primary Examiner* — Tony G Soohoo
*Assistant Examiner* — Peter Keyworth
(74) *Attorney, Agent, or Firm* — Knobbe, Martens, Olson & Bear, LLP

(57) ABSTRACT

A method is provided for treating wastewaters and sewage slurries, and for converting them to disinfected and stabilized sludge by irradiating with electrons and mixing with a base which steps produce a sludge that conforms to the EPA's requirements, and that is usable in agriculture.

4 Claims, 2 Drawing Sheets

METHOD OF TREATING RAW SEWAGE SLURRY

RELATED APPLICATIONS

This application is a U.S. National Phase of International Application No. PCT/IL2006/000427, filed Apr. 4, 2006, designating the U.S. and published in English on Oct. 19, 2006 as WO 2006/109293, which claims the benefit of Israel Application No. 168041, filed Apr. 14, 2005

FIELD OF THE INVENTION

The present invention relates to a method of treating wastewaters and slurries. The treated material is irradiated with electrons, and mixed with a base, such as lime, thereby being converted to a stabilized and essentially disinfected sludge usable in agriculture.

BACKGROUND OF THE INVENTION

The waste water treatment is one of the main tasks of the human civilization. The continual production of sewage water makes in the U.S. alone for a streamflow (about 1000 m$^3$/s) greater than that of the river Thames. The treatment aims at lowering the sewage volume, reducing its unpleasant odor, ridding it of hazardous chemicals, and at neutralizing microbial pathogens. The modern sewage treatment may comprise, beside separation techniques (such as sedimentation, filtration, centrifugation, or coagulation), also biological treatment (such as aerobic treatment or anaerobic digestion), heat treatment (such as pasteurization, drying, incineration), chemical treatment (such as using formaldehyde, sodium hydroxide, lime, strong oxidizers, etc.), and irradiation (such as using γ rays, UV light, electron beam). Before discharging the resulting sludge into the environment, e.g., to landfills or to the ocean or for agricultural use, its chemical and biological properties must comply with still stricter environmental standards.

The pathogenic factors, comprising viruses, bacteria, protozoa, or larger parasites such as worms, remain the most imminent health hazard presented by sewage water during all its processing stages. Some of the organisms, or their stable forms such as spores or cysts or eggs, may survive harsh conditions of various sewage treatments, and they may even get concentrated during dewatering the sewage into the sewage sludge. The microbial contamination of water is usually characterized by a coliform count, since the amount of *Escherichia coli*-like bacteria is widely used for indicating faecal pollution and assessing the risk of waterborn disease. The coliform count, being as high as $10^{11}$ CFU (colony forming units) in 100 g of raw sewage slurry, should be lowered to less than $10^5$ or $10^2$, depending on the country, type of regulation, and also according to whether the subsequent use of the resulting sludge is defined as unrestricted or restricted. For example, the Environmental Protection Agency (EPA) defines two types of biosolids in regard to pathogen reduction, Class B has a reduced level of pathogens, whereas Class A is nearly pathogen free.

Although there are various biocidal methods, to choose a cost-effective combination of available techniques is a nontrivial task in view of large volumes to be treated, many non-biological contaminants to be considered, and time-, place-, and volume-dependent costs of individual techniques. Therefore, there is a continuous need of new technologies for waste water treatment, and it is an object of the invention to provide a novel method for treating a raw sewage slurry.

Lime seems to have been used for deodorizing waste, or, as it is nowadays called, stabilizing it, from ancient times. The high pH, caused by calcium oxide or hydroxide, inhibits the microbiological activity and reduces the pathogens count. However, after subsequent acidification, e.g. by absorbing carbon dioxide, some pathogens may reappear. Another disinfection method uses the irradiation by high energy electrons. However, huge volumes of urban wastewater to be treated, together with high doses necessary for the complete pest annihilation make the method too expensive when used alone. Japanese Patent Publication No. 11319793 describes a method of decomposing organochlorine compounds in sludge by irradiating with an electron wave. Japanese Patent Publication No. 54109244 describes a method of treating organic sludge by adjusting its pH to 9-14 and subsequent irradiating it by electron beam. Korean Patent Application KR 208956 describes a method for treating wastewater by adjusting its pH, followed by the electron irradiation. However, the described methods either do not avoid the problem of great processed volumes resulting in costly, high energy demands for the irradiation stage, or said methods include additional treatments, such as biological treatments, making the whole process complex and expensive. U.S. Pat. No. 4,187,176 discloses a treatment plant for removing heavy metals from wastes by irradiating only that part of the sludge that contains heavy metals, which metals are converted into a well sedimenting form.

It is therefore an object of the invention to provide a method of treating sewage slurry comprising the irradiation with electrons, wherein said raw sewage slurry is first dewatered and thickened before said irradiating.

It is another object of this invention to provide a method of treating raw sewage slurry after dewatering and thickening, comprising irradiating with electrons followed by the treatment with a base.

It is also an object of this invention to provide a cost effective method for processing large volumes of urban wastewaters, which method includes partial dewatering of the raw slurry, irradiating obtained preconcentrated slurry with high energy electrons, and treating the irradiated sludge with a base, such as lime, thereby obtaining a final sludge for discharging into the environment, with allowable microbial count, possibly for use in soil recultivation or reclamation, and in agriculture.

Other objects and advantages of present invention will appear as description proceeds.

SUMMARY OF THE INVENTION

The present invention provides a method of treating a raw sewage slurry comprising i) providing a preconcentrated sewage slurry having from about 10 to about 40% dry weight (% dw); ii) irradiating said slurry with an electron dose of from 2.5 kGy to 20 kGy; iii) mixing the irradiated slurry from the previous step with a base that is added in an amount of from about 20 to about 200 kg per 1 ton of dry weight of said irradiated slurry, thereby obtaining an essentially homogeneous mixture; and iv) allowing said base and said irradiated sludge to react in said mixture for at a pH of at least 11.5; thereby obtaining essentially disinfected and stabilized sludge. Said base may be any environmentally acceptable base, for example quick lime or slaked lime. Said raw slurry is preferably dewatered sewage slurry containing from 15 to 25% dw, and said base is preferably added in an amount of from 5 to 50 kg per 1 ton of said irradiated slurry. In a preferred embodiment, base is added in an amount of from 30 to 150 kg per 1 ton of dry weight of said irradiated slurry. Said mixture of a base and slurry has preferably a pH of at least 11.5. In one preferred embodiment, said mixture has a pH of at least 12, and said base and said irradiated slurry are allowed to react in said mixture for at least 2 hours, preferably additionally leaving said mixture for at least 22 hours at a pH of at least 11.5. Said sludge is essentially free of coliform bacteria, the coliform count being preferably lower than 2 MPN. Said sludge may be safely used in agriculture or in reclamation of disturbed sites. The final product of the method of the invention, essentially disinfected and stabilized sludge, complies with the EPA's requirements for Class A biosolids.

The invention is further directed to a method of treating wastewaters or sewage slurries comprising i) dewatering said wastewaters or sewage slurries to obtain a preconcentrated slurry having 15-25% dw; ii) irradiating said preconcentrated sludge by an electron dose of from 2.5 kGy to 20 kGy, preferably about 10 kGy; and iii) mixing the irradiated slurry from the previous step with lime, thereby obtaining essentially homogeneous mixture having pH at least 11.5; and iv) allowing said lime and said irradiated sludge to react in said mixture for more than 2 hours; thereby obtaining essentially disinfected and stabilized sludge. In a preferred embodiment, said lime comprises calcium oxide, in another preferred embodiment said lime comprises calcium hydroxide. The pH of the homogenized mixture is at least 12.

BRIEF DESCRIPTION OF THE DRAWINGS

The above and other characteristics and advantages of the invention will be more readily apparent through the following examples, and with reference to the appended drawings, wherein.

DETAILED DESCRIPTION OF THE INVENTION

Figure 1:
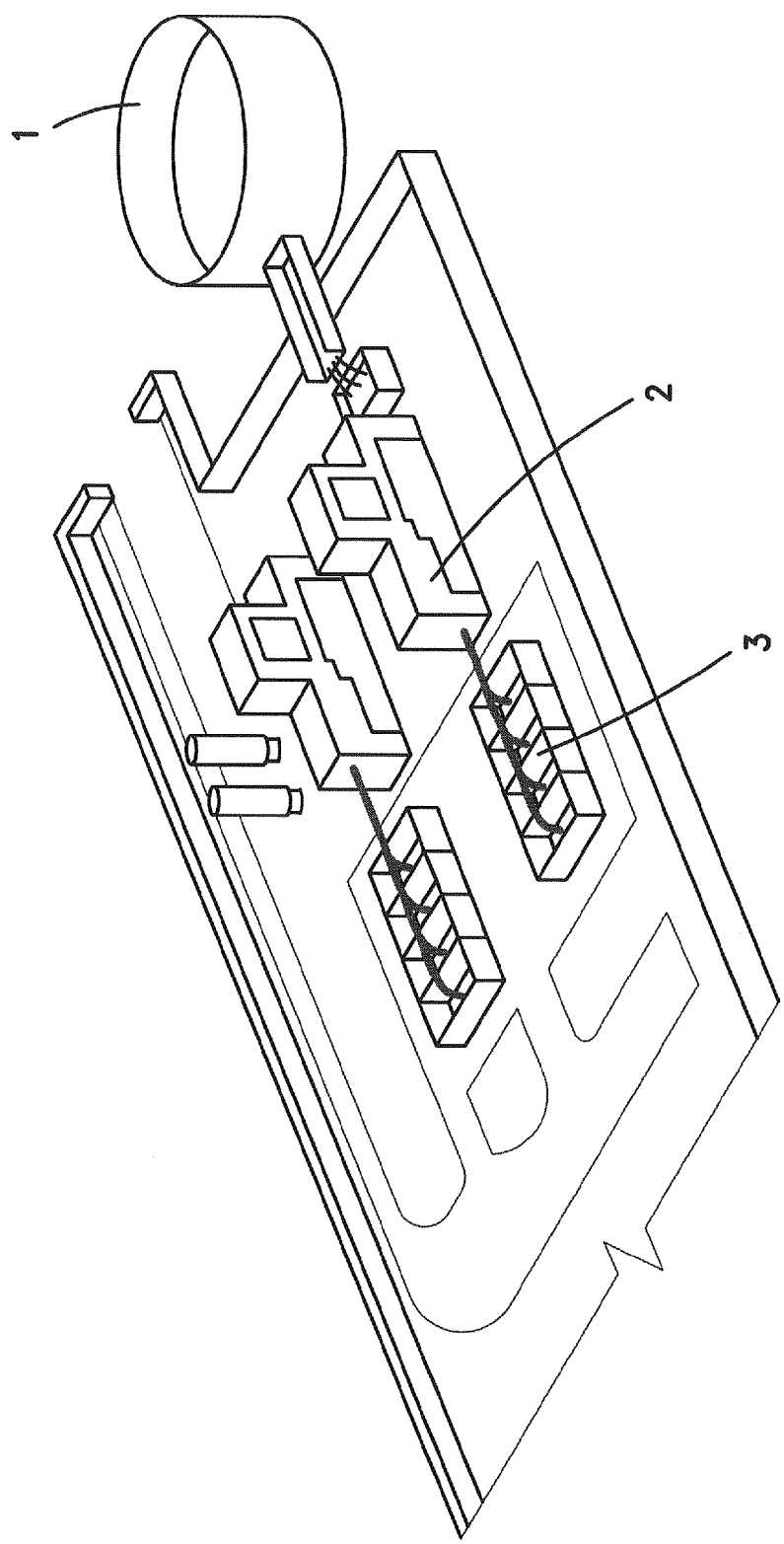
FIG. 1. is a schematic drawing of a plant comprising a unit for treating raw sewage slurry according to the invention: a preconcentration unit (1), treatment unit (2), stabilization unit (3).

It has now been found that large amounts of sewage water slurry may be processed by irradiating preconcentrated sewage slurry of about 20 dw % with electron dose of about 10 kGy, mixing the irradiated slurry with 15 kg calcium hydroxide per 1 ton treated slurry, and allowing the components to react for several hours. The above combination of steps provides a product that complies with the Israeli regulations for discharging a treated waste sludge into the environment.

The invention relates to a method of treating sewage slurry, comprising irradiating sewage slurry preconcentrated to contain from about 90 to about 60 wt % of water with an electron dose of from 2.5 kGy to 20 kGy, mixing the irradiated slurry with a base, which may be lime or other environmentally acceptable base, that is added in an amount of from about 20 to about 200 kg per 1 ton of dry weight of said irradiated slurry, thereby obtaining an essentially homogeneous mixture, preferably having a pH of at least 11.5, and still more preferably at least 12.0, and allowing said lime and said irradiated sludge to react in said mixture for more than one hour, preferably at least for 2 hours at a pH of at least 12, adding preferably at least 22 more hours at a pH of at least 11.5, thereby obtaining essentially disinfected and stabilized sludge.

Said sewage slurry preferably originates from municipal wastewater, which, after thickening and dewatering by processes used in the art, comprising, e.g., centrifuging, filtering, sedimenting, etc., provides a suspension or paste exhibiting a strong odor and a high pathogen concentration, and attracting pests. Said suspension of the raw slurry to be treated may have a consistence of dense fluid, thin or dense paste, or wet dust, according to the type of contaminations and the water content in the suspension. The words "slurry" and "sludge" are used similarly herein, and mean a relatively dense suspension in the context of the invention, wherein the density is measured as kg dry mass per 100 kg mixture, and is denoted as % dw. "Raw sewage slurry" means a slurry derived from the waste water that was processed only by techniques directed to dewatering, and not directed to lowering the amount of the pathogens. "Disinfected" relates to substantially lowered pathogen count, and "stabilized" relates to substantially lowered odor and attraction for insects.

It is understood that the method of the invention may be utilized for disinfecting and stabilizing sewage slurries by itself, or, alternatively, together with other techniques known in the art of wastewater treatment, comprising, but not limited to, aerobic digestion, anaerobic digestion, dewatering, drying, etc.

In a preferred embodiment of the invention, a raw sewage slurry, preconcentrated to a consistency of paste is processed. A concentrated, unstabilized, and biologically untreated slurry is irradiated by an electron beam and mixed with lime. Concentrating the slurry before the irradiation saves the total costs for the irradiation. Irradiating the slurry before stabilizing with lime further reduces the volume that must be irradiated. A biological treatment, such as aerobic fermentation or anaerobic digestion is often included in wastewater treatment technologies, and it aims at reducing pathogens and odor. Excluding the biological treatment, whose role is taken in the method of the invention mainly by the irradiation, and partially by the lime treatment, simplifies the whole process. The method of the invention provides a final slurry without strong odor, and with coliform counts as low as 2 or less, when measured as MPN (most probable number) per gram dry weight (dw), whereas the Israeli regulations for biosolid of Class A would allow 1000 MPN.

In one preferred embodiment of the invention, a raw sewage slurry of about 20-25 dw % is irradiated with a dose of electrons of about 10 kGy, and immediately mixed with calcium hydroxide or calcium oxide which is added preferably to an amount of about 5 to 50 kg per 1 ton of said raw slurry, more preferably in an amount of about 10 to 30 kg per 1 ton, for example in an amount of about 15 kg per 1 ton. The mixture is stirred to achieve essentially homogeneity, and allowed to stand so that the components may react for at least 2 hours at pH 12, preferably followed by standing for at least 22 hours at pH at least 11.5. The amount of a base that is added preferably suffices to bring the pH of the mixture to at least 12.

Figure 2:
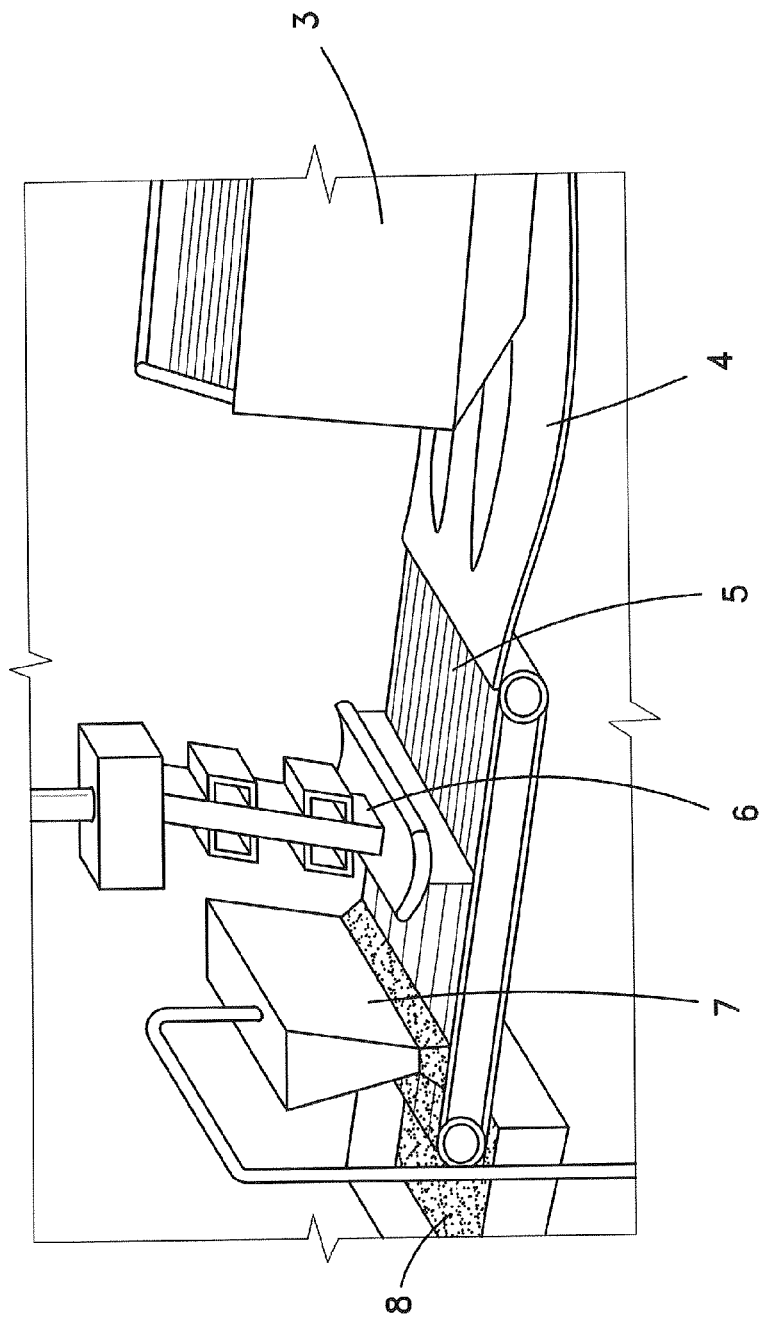
FIG. 2. is a schematic drawing of a unit for treating raw sewage slurry according to the invention: a container (3), an extruder device (4), a conveyer (5), an irradiation device (6), a base dosing device (7), a container (8).

In one aspect, the invention is directed to processing municipal sewage, which is rid of gross components, both floating and sedimenting, thickened and dewatered, in order to decrease the water content to less than 90 wt %, and possibly to less than 60% wt, preferably to between 80 wt % and 75 wt %, thereby obtaining a raw sewage slurry. Said raw slurry, preferably having the consistency of paste, is spread to a layer preferably up to 20 mm thick, and irradiated by a dose from 2.5 kGy to 20 kGy. Commercially available devices may be utilized to provide electron beams. Such device comprises a high voltage source, preferably providing from about $10^6$ to $10^7$ volts, electron source and accelerator with a magnetic focusing apparatus. In a plant that processes a slurry according to the method of the invention, having an output of 3 kg slurry/s at an irradiation of 10 kGy, an electron generator should have a power of more than 30 kW (A continuous output of about 3 kg/s would produce about 100,000 tons of treated sludge per year, which equals to the annual production of Tel-Aviv sewage treatment unit "Shafdan"). A base, such as lime, is added to the irradiated slurry in an amount preferably from about 5 to about 50 kg per 1 ton slurry, and more preferably from about 6 to about 30 kg per 1 ton, and said slurry is eventually stirred with said base to provide an essentially disinfected homogeneous mixture. Homogenizers known for mixing dense suspensions or pastes may be utilized. The reaction between said base and components in said slurry is allowed to continue for at least 1 hour, preferably at least for 2 hours at pH 12, preferably followed by additional 22 hours at a pH of at least 11.5, in order to finish the sludge stabilization before its eventual releasing to the environment. The use of quick lime causes an increase in temperature, which may further contribute to the global effect and efficacy of the method. The invention is illustrated in the scheme of FIG. 1, showing a plant for processing sewage slurry, comprising a preconcentration unit (1) providing a slurry containing between 10 and 40% dw, preferably containing at least 20% dw, treatment unit (2) in which the slurry undergoes the irradiation and lime addition, and stabilization unit (3) in which the mixture of base with slurry is stored before releasing to the environment. Said treatment unit is shown in more detail in FIG. 2. Said preconcentrated slurry is extruded from a container (3) through extruder device (4) onto conveyer (5), forming a layer less than 20 mm high. The slurry layer moves under irradiation device (6), absorbing a dose of about 10 kGy, and continues under a base dosing device (7), which is adding from 5 to 50 g, e.g. about 20 g, base dust per each kg of the slurry. The slurry, sprinkled with base falls from the conveyer to container (8). The mixture is well homogenized in said container or/and in said stabilization unit (3). Said conveyer surface is covered with plates made of material resistant to said base. The process occurring in said treatment unit (2) is a continuous process for bulk conversion of preconcentrated sewage slurry into a disinfected and stabilized sludge. The above elements, such as conveyers, transporters, pumps, etc, are adjusted to the consistency of the slurry which is processed. In one preferred embodiment, the slurry has a consistency of paste and is not freely fluid. Of course, the method of the invention may be used within any other technology for wastewater or sewage slurry treatment, and the steps may be arranged differently, using additional techniques known in the art.

The invention, thus, provides a method of treating raw sewage slurry, comprising irradiating pretreated wastewater, followed by mixing with a base, such as lime, wherein said pretreatment comprises dewatering, thereby providing sludge with substantially reduced odor and coliform count near to zero. The method of the invention may be included in a technology for processing a waste material as a stage substantially eliminating pathogens. Said waste material may be municipal sewage, industrial waste, agricultural waste, or any other water-based fluid material presenting biohazard. Said technology may comprise, beside the mentioned stages of the method of the invention, additional stages comprising known techniques for adjusting the properties of the final sludge or cake, and for removing other undesired components (e.g., heavy metals, solvents, detergents, organophosphates, chlorinated compounds, etc.). In one aspect, the method of the invention provides a technology for large scale processing of raw sewage slurry. In another aspect, the method of the invention provides a technique for disinfecting and stabilizing the waste material, which technique may be included in a waste-processing technology, comprising additional techniques.

Although the method of the invention may be advantageously incorporated in a broader technology comprising many other technology elements, including many known techniques for processing waste materials, a skilled person will appreciate that the method of the invention is capable, by itself, to efficiently disinfect and stabilize a raw sewage slurry obtained from bulk wastewater, such as municipal sewage. The special combination of techniques in the method of the invention, enables, beside removing pathogens, eliminating other potentially present detrimental components of sewage slurry. The high pH caused by a base precipitates most metals that are present in the waste, reducing their solubility and mobility. When using lime, calcium ions react with odorous sulfur species, such as hydrogen sulfide and organic mercaptans, and form complexes with them, thus actually destroying and not merely covering the waste odors. Further, a base such as lime reacts with phosphorous compounds, and the electron beam destroys many hazardous organic chemicals, such as chlorinated hydrocarbons.

The method of the invention, applied to waste water or sewage slurry, provides a substantially pathogen-free and stabilized sludge. Said sludge complies with the EPA regulations for Class A biosolids. The essentially disinfected and stabilized sludge provided by the invention as a final product of sewage purification may be safely used in agriculture, without restrictions. Said final product may be also used with advantage in programs comprising soil recultivation, reclamation, or revegetation.

In a preferred embodiment, the method of the invention provides a continual process for converting wastewater to a product that may be discharged into the environment, in accordance with then regulations. Said process comprises dewatering said wastewater, thereby providing raw sewage slurry, preferably containing 15-20% dw, continually irradiating said slurry with an electron dose of 2.5-20 kGy, thereby neutralizing the most of pathogens. The irradiated slurry is mixed with a base, such as lime, added to a pH of at least 12, usually in a concentration of from about 0.5 to about 5.0 wt %, and well stirred to provide a homogeneous mixture. Said mixture is stirred on or allowed to stand for the time necessary for stabilizing the sludge, which is preferably at least for 2 hours at a pH of at least 12. According to the type of slurry, the minimal irradiation dose may be experimentally determined, using biological assays performed with in-process samples. Also the amount of lime to be added, and the time to allow the mixture to stand, may be optimized, using pH measurements, olfactory assessments, and other methods used in the art. Usually two hours at pH 12 will be enough, the period being preferably longer for lower pH values.

The invention will be further described and illustrated in the following examples.

EXAMPLE

The experiment was performed in "Shafdan" sewage treatment plant, Tel-Aviv, Israel. Wastewater, 150 liters, was centrifuged to produce 1 kg of slurry containing about 20 dw %. The raw slurry was irradiated by an electron dose of 10 kGy, using RDI electron generator, having capacity 150 kW, at 3 million volt.

Dry weight was determined by heating a 10 g sample laid to a width about 2-5 mm at 105° C. for 3 hours. The above slurry was found to have 19.3 dw %. The coliform count was measured as MPN per 1 g dry weight, according to the Standard Methods for the Examination of Water and Wastewater (SM 9221 E, performed by Aminolab, Ltd., Rehovot, Israel).

To seven samples of raw slurry, 100 g each, $Ca(OH)_2$ was added in amounts from 0 to 10 g, and pH was examined (SOP#C-015, Aminolab Ltd.). The pH of irradiated slurry was 5.8, and the pH of six samples to which calcium hydroxide was added in amounts from 0.5 to 10 g was about 12.1 to 12.2 and remained stable for 3 days. An olfactory check showed disappearance of strong odor from all treated samples. The coliform count of the non-treated part was $1.1 \times 10^9$ MNP, and the coliform counts of the irradiated and lime treated samples were <2 MNP.

The examples show that the combination of techniques according to the method of the invention ensures practical disinfection and stabilization of raw sewage slurry.

While this invention has been described in terms of some specific examples, many modifications and variations are possible. It is therefore understood that within the scope of the appended claims, the invention may be realized otherwise than as specifically described.

The invention claimed is:

1. A continuous process for the large scale conversion of raw preconcentrated sewage slurry into a disinfected and stabilized sludge having a coliform count lower than 2 MPN/g of dry weight, for use in agriculture or disturbed land reclamation, said process consisting of:
   (i) providing a first container comprising a raw preconcentrated sewage slurry having 10 to 40% dry weight (% dw);
   (ii) extruding said raw preconcentrated sewage slurry from said first container through an extruding device and spreading said raw slurry onto a plate conveyor so as to obtain a slurry layer up to 20 mm high;
   (iii) conveying said slurry layer under an irradiation device and irradiating said slurry layer with an electron dose of from 2.5 kGy to 20 kGy, thereby obtaining an irradiated slurry layer;
   (iv) conveying said irradiated slurry layer under a base dosing device and adding a base selected from the group consisting of quick lime and slaked lime, wherein said base is added in an amount of from 5 to 50 kg per ton of said slurry so as to bring the pH of the mixture to at least pH 12;
   (v) conveying said irradiated slurry layer with said base into a second container and stifling the mixture into said second container so as to obtain an essentially homogenous mixture; and
   (vi) allowing said homogenous mixture to react for at least 2 hours at a pH of at least pH 12 to yield said disinfected and stabilized sludge.

2. The process of claim 1, wherein the homogeneous mixture of step (vi) is allowed to react for 24 hours at a pH of at least pH 12.

3. A continuous process for the large scale conversion of wastewaters into a disinfected and stabilized sludge having a coliform count lower than 2 MPN/g of dry weight, for use in agriculture or disturbed land reclamation, said process consisting of:
   (i) dewatering said wastewaters to obtain a preconcentrated slurry having 10 to 40% dry weight (% dw);
   (ii) spreading said preconcentrated slurry onto a plate conveyor to form a layer up to 20 mm high;
   (iii) conveying said slurry layer under an irradiation device and irradiating said layer with an electron dose of from 2.5 kGy to 20 kGy thereby obtaining an irradiated slurry layer;
   (iv) conveying said irradiated slurry layer under a base dosing device and adding a base selected from the group consisting of quick lime and slaked lime, wherein said base is added in an amount of from 5 to 50 kg per ton of said slurry so as to bring the pH of the mixture to at least pH 12;
   (v) conveying said irradiated slurry layer with base into a container and stirring the mixture to obtain an essentially homogenous mixture; and
   (vi) allowing said mixture to react for at least 2 hours at a pH of at least pH 12 to yield said disinfected and stabilized sludge.

4. The process of claim 3, wherein the homogeneous mixture of step (vi) is allowed to react for 24 hours at a pH of at least pH 12.

* * * * *